Figure 5:
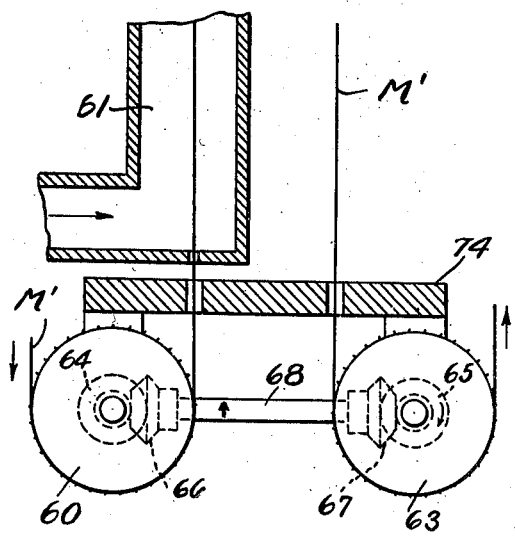

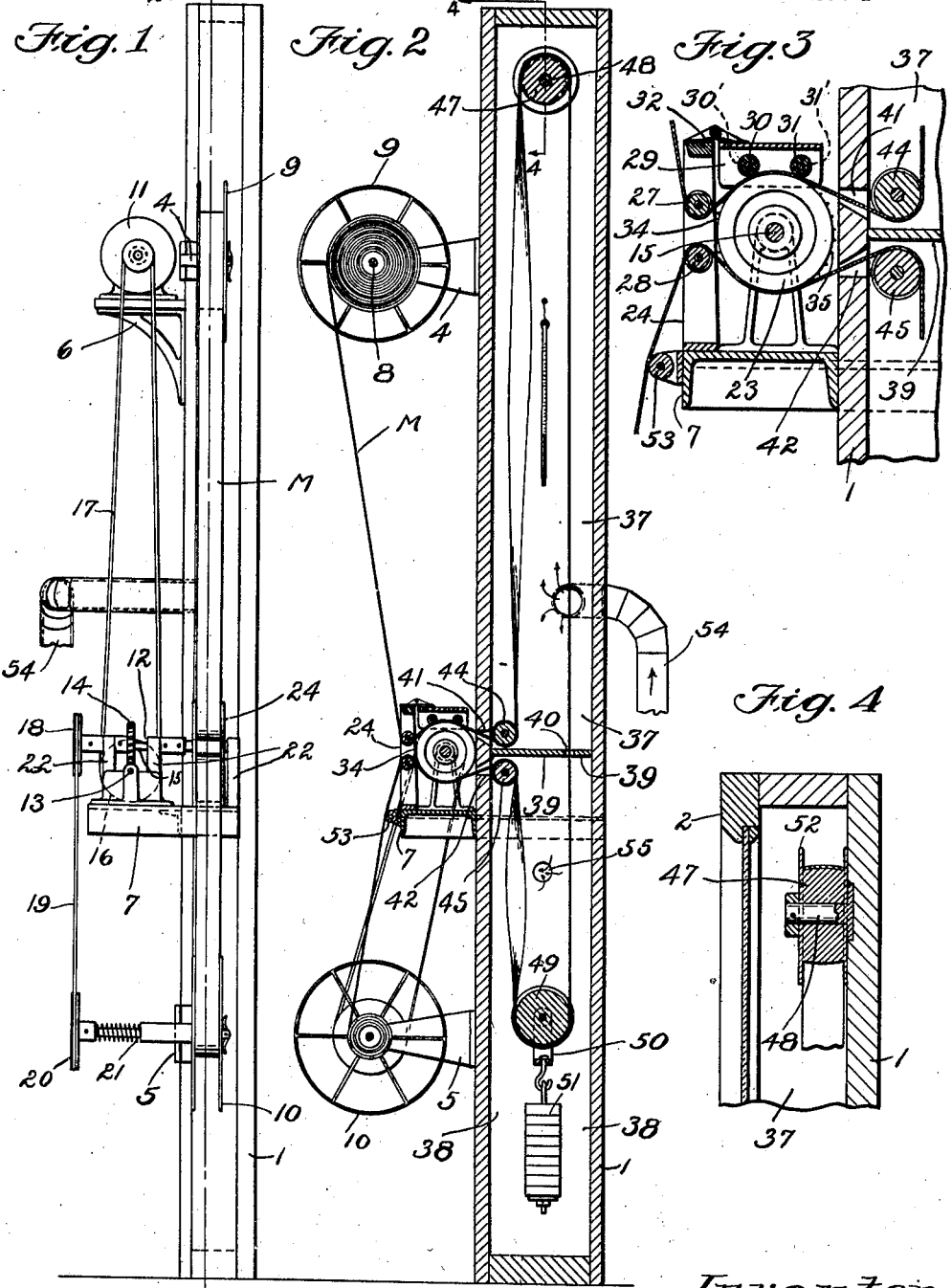

Jan. 4, 1927.

L. T. TROLAND 1,613,300

CINEMATOGRAPHIC FILM STRETCHING

Filed April 25, 1925      2 Sheets-Sheet 2

Inventor:
Leonard T. Troland
by Roberts Roberts & Cushman
Att'ys.

Patented Jan. 4, 1927.

1,613,300

UNITED STATES PATENT OFFICE.

LEONARD T. TROLAND, OF MALDEN, MASSACHUSETTS, ASSIGNOR, BY MESNE ASSIGNMENTS, TO TECHNICOLOR MOTION PICTURE CORPORATION, OF BOSTON, MASSACHUSETTS, A CORPORATION OF MAINE.

CINEMATOGRAPHIC FILM STRETCHING.

Application filed April 25, 1925. Serial No. 25,916.

This invention relates to the treatment of cinematographic film strips and involves film stretching to effect a general elongation or to produce variable elongations of films in proportion to variable shrinkage throughout the length thereof.

Among the many causes of film shrinkage may be mentioned the following by way of example. In the commercial working of the imbibition process it is found that the matrix has a tendency to shrink and that after the printing of a number of blanks, generally less than the number which it is desired to print in the ordinary operation of the imbibition process, a general shrinkage of such extent occurs that the matrix is apt to be destroyed, due to tearing of the sprocket holes during registration with a normal blank, unless the matrix is stretched.
Also during storage of matrices for periods of substantial length between their periods of use shrinkage frequently occurs. The positive blanks used in the imbibition process, if punched by inaccurate perforating machinery may also need to be stretched to render them uniform throughout their lengths prior to use. There are also two conditions which occur under certain circumstances which also render film strip stretching necessary in the case of printed films. "Cupping", a condition in which the edges perforated by the sprocket holes are shorter than the image carrying portion intermediate the sprocket holes, may necessitate stretching to overcome the condition. Under other circumstances "grapevining" results, that is, the edge portions of the strip are longer than the image bearing portion.
Among the objects of the present invention is the provision of a method of film treatment which will overcome the difficulties mentioned and which will provide for more than a mere transitory improvement in the condition of the film treated. Another object is the provision of apparatus for carrying out the method in which a long film strip may be treated in a continuous process, in which accurate results may be produced, in which the process may be carried out substantially automatically, and in which care may be taken of changing or different conditions of the film strips under treatment.

In one aspect the invention comprises film feeding and winding means, which may be provided by the same or different toothed members, and means cooperating with said feeding and winding means for stretching a film strip beyond its elastic limit to effect a relatively permanent change in condition thereof. The elastic limit may be reduced by appropriately heating the film if desired and the film may be retained under tension until cooling takes place. The stretching may be effected by means for lengthening the path of film travel between the feeding and winding means a predetermined amount, or by means providing an adjustable tension upon the portion undergoing stretching. Under certain conditions means may be provided to tension the edges more than the middle of the strip and under other conditions resort may be had to a reverse arrangement. To heat the strip a heater may be arranged in a chamber through which the strip passes while under tension, or heated air may be supplied to such a chamber to render plastic the film strip passing therethrough.

The humidity of the heating medium is of much less importance than the temperature, but reasonably dry air of approximately 50% humidity is desirable.

For the purpose of illustrating the invention one embodiment and a modification are disclosed in the accompanying drawings, in which:

Fig. 1 is a side view;
Fig. 2 is a section on the line 2—2 of Fig. 1;
Fig. 3 is a fragmentary view on an enlarged scale of a portion of the structure disclosed in Fig. 2;
Fig. 4 is a vertical section on the line 4—4 of Fig. 2; and
Fig. 5 is a somewhat diagrammatic view of a modified form of the invention.

In the apparatus illustrated in Figs. 1 to 4 of the drawings, 1 represents a casing of suitable material and provided with one or more doors 2 having glass plates therein through which conditions inside the casing may be observed. The interior of the casing is divided into two chambers 37 and 38 by a transversely extending partition 39 having an opening or slot 40 therethrough. Mounted upon the exterior of the casing are brackets 4, 5, 6, and 7. Bracket 4 supports a journal 8 upon which a supply reel 9 is rotatable. Bracket 5 supports a take-up reel 10 receiving the stretched strip upon completion of the process. Bracket 6 supports a motor 11 which drives a positive feeding and winding, or traction mechanism, generally designated 12, which is mounted on the bracket 7. Mechanism 12 comprises a shaft 13 which through a worm coaxial therewith drives a worm wheel 14 upon a shaft 15. The shaft 13 carries a pulley 16 which is driven by a belt 17 from the motor 11, and shaft 15 carries a driving pulley 18 connected by a belt 19 to a pulley 20 which is coaxial with the take-up reel 10. The pulley 20 is connected through a suitable friction mechanism 21 with the take-up reel 10, the friction connection permitting the slippage necessary as the quantity of film upon the reel increases. The shaft 12 is journalled in standards 22 and carries thereon a toothed member 23 whose construction will shortly be described. A rectangular frame 24 having side elements spaced apart by a distance slightly greater than the width of the member 23 is mounted on the bracket 7 in such position that a plane contacting with the sides of the member 24 toward the member 23 is substantially tangent to the periphery of the latter. Supported for rotation on parallel axes in the frame 24, in positions substantially equidistant above and below the horizontal plane including the axis of rotation of the member 23, are guide rolls 27 and 28. Pivotally supported by the top of the frame 24 is a member 29 U-shaped in cross section and carrying a pair of rolls 30 and 31 lying in the same vertical planes transverse to the axis of the member 23 as the latter and approximately equi-distant from the vertical plane including the axis of the member 23. The rolls 30 and 31 have grooves 30' and 31' into which the sprocket teeth extend. Spring means 32 presses the member 29, together with the rolls 30 and 31, toward the surface of the member 23.

The member 23 has a cylindrical peripheral surface 34 and around this surface extend two rows of tapered pins 35. These pins may be held in place in any desired manner and are preferably hardened by swaging and tapered, the pins of one row being adapted to fit the sprocket holes in the film strip exactly, both longitudinal and transversely of the film strip, while the others may preferably fit the sprocket longitudinally, but not transversely, thereby affording clearance to take care of shrinkage or expansion transversely of the strip.

An opening 41 is formed in the wall of the chamber 37 at a point just above the partition 39 and an opening is formed in the wall of the chamber 38 at a point just below the partition 39. The openings 41 and 42 fall just above and just below the horizontal plane which includes the axis of the member 23 and within the chamber 37 and 38 are guide rolls 44 and 45 so positioned that portions of the film strip tangential to the member 23 and to the rolls 44 and 45 will pass through the openings 41 and 42 without touching the casing.

Adjacent the top of the chamber 37 a roll 47 is rotatable upon a stub shaft 48 and within the lower chamber 38 is disposed a roll 49 having a yoke 50 connected thereto and supporting from said yoke a variable weight 51, the roll and its connected parts being supported in a loop of the film strip as later described. Depending upon the nature of the stretching operation desired, that is whether simple elongation or the curing of "cupping" or "grapevining" is needed, the rolls 47 and 49 may be provided with truly cylindrical, concave or crown peripheries. In each case the rolls are preferably provided with flanges 52 spaced apart so as to receive approximately exactly between them a film strip of standard width. All the other rolls mentioned are also provided with flanges to guide the film strips properly thereover. Upon the brackets 7 a roll 53 is provided to guide the film strip as it passes downward to the take-up reel 10.

To render the film strip plastic and lower its yield point the portion of the film within the chamber 37 is warmed, preferably to a temperature of about 160° F. and for this purpose heated air of average humidity is supplied to the chamber 37 through a pipe 54. The chamber 38 may be cooled if desired by the supply of cold air thereto but it is ordinarily sufficient if a temperature not much above atmospheric is maintained in this chamber, and to facilitate this a vent 55 is provided to permit any heated air securing access to the chamber through the opening 40 to escape.

As may best be observed from Fig. 2 a film strip M is drawn from the supply reel 9 downwards under the roll 27 and then over the top of the member 23 in contact with whose periphery the strip is held by the rolls 30 and 31, the engagement of the pins 35 with the sprocket holes of the strip positively drawing the film at a definite rate. From the member 23 the strip passes under the roll 44, thence upward, making half a turn before it reaches the roll 47, over the top of that roll, and then downward through the slot 40 and beneath the roll 49 which it supports, thence upward, making another half turn, over the roll 45, and into engagement with the lower surface of the member 23, which draws or winds it in at a predetermined rate. Leaving the member 22 the strip passes over the rolls 28 and 53 and down to the take-up reel upon which it is wound. The strip M is wound with its image carrying or printing surface outermost upon the reel 9, and accordingly the only member with which this surface of the strip contacts at any time during its whole period of travel from the supply to the take-up reels is the member 23, and as this member has a highly polished surface and as sliding relative to the surface is absolutely precluded by the engagement of the pins 35 upon the member 23 with the sprocket holes in the film strip there can be no damage to the strip through scratching or abrasion.

As the strip enters the chamber 37 it is subjected to the heating action of the air therein and, at a temperature of about 160° F., it becomes semi-plastic and its yield point is substantially lowered so that a weight of but a few pounds is sufficient to stretch the film strip the necessary amount. As each portion of the strip undergoes warming under tension as it passes through chamber 37 all parts of the strip will be approximately equally elongated and the weight 51 is adjusted to preclude over-stretching while providing for stretching to the necessary degree. If the rolls 47 and 49 are made with crown surfaces the central portions of the film strips will be tensioned more than the edges and accordingly will stretch to a greater extent. Film strips in which "grape-vining" has taken place may therefore be brought to a condition in which the edges of the film strip will be no longer than the central or image-bearing portion. If "cupping" has occurred, concave rolls may be used, and as this will throw the major tension upon the lateral edges of the film strips the condition of "cupping" will be overcome. If, as in the case of matrices, the film strip has simply shortened generally the elongation necessary to permit the safe use of the matrix for further printing will be effected by cylindrical rolls. As the film strip passes through the chamber 38 for a substantial distance before it again reaches the member 23 it is given an opportunity to cool sufficiently so that it sets in its stretched condition, the period of setting before leaving this chamber being determined by the distance the strip is caused to travel therein.

Fig. 5 shows diagrammatically a modified construction. In this form of the invention, the film strip M' passes from a supply reel (not shown) downwardly over a toothed paying-out member 60, thence upwardly through a warming chamber 61, over a bodily adjustable roll 62, and downward and under a winding or tension toothed member 63 from which it passes off and is wound up by a winding or take-up reel not shown. The structure of the members 60 and 63 correspond closely to that of the member 23 previously described. Each of these members 60 and 63 has a cylindrical surface provided with spaced annular rows of hardened sprocket teeth adapted to fit into the sprocket holes of a film strip to be stretched. Coaxial with the members 60 and 63 and rotating respectively therewith are bevel gear members 64 and 65 which mesh respectively with beveled gear members 66 and 67 carried upon a rotatable shaft 68. This mechanism provides equal peripheral speeds for the members 60 and 63. The members 60 and 62 are suitably driven by power. The roll or pulley 62 which is preferably provided with lateral flanges 69 may have its surface 70 cylindrical, or be made either in the form of a crown pulley or a concave pulley depending upon the result which the stretching is designed to accomplish. This pulley is journalled in a yoke member 71 and the latter is in turn carried by a vertically adjustable rod 72 which passes through a bushing 73 supported in a frame 74 which also supports the members 60 and 63. A nut 75 co-operates with the threaded upper end 72' of the rod 72 and is adjustable to effect bodily adjustment of the roll 62 in a direction perpendicular to the plane including the axes of the members 60 and 63. The nut and screw construction may be a micrometer arrangement and the length of the film strip between the point of tangency with the adjacent sides of the members 60 and 63 may be exactly adjusted to a predetermined length, say a given number of standard sprocket hole spaces or slightly longer to compensate for slight contraction after the stretching. As a result a film strip subjected to the action of this mechanism will be brought to an exactly standard form. In general this mechanism, save that the paying-out and winding-in means are separate from each other instead of being combined in a single member as in the first means and that the length of path between the paying-out and winding-in means is adjustably predetermined instead of being subject to possible variation, is similar to the mechanism illustrated in Figs. 1 to 4, although of course mechanical details are substantially different and cooling in this form will be observed to take place in the open air.

While this application discloses one specific embodiment of the apparatus constructed in accordance with the invention and well adapted to the practice of the inventive process and also a modified form of mechanism, it is to be understood that various other embodiments may be produced and that radical structural changes may be made without departing from the spirit of the invention or the scope of the appended claims.

I claim:

1. The method of treating cinematographic film strips which includes the steps of rendering a film strip plastic, stretching the same while plastic, and setting the stretched film strips.

2. The method of treating cinematographic film strips which includes the steps of heating a film strip to render it plastic, stretching the same while plastic, and cooling the stretched film strip to set it in stretched condition.

3. The method of treating cinematographic film strips which includes the steps of rendering a film strip plastic, stretching the same while plastic, and setting the stretched film while under tension.

4. The method of treating cinematographic film strips which includes the steps of heating a film strip to render it plastic, stretching the same while plastic, and cooling the stretched film to set it while it is still under tension.

5. The method of treating cinematographic film strips which includes the steps of rendering a film strip plastic, longitudinally tensioning said film strip while plastic under tension unequally applied transversely thereof, and cooling the stretched film strip to set it.

6. The method of treating cinematographic film strips which includes the steps of heating a film strip to render it plastic, longitudinally tensioning said film strip while plastic under tension unequally applied transversely thereof, and cooling the stretched film to set it while still under tension.

7. The method of stretching cinematographic film strips which includes the steps of placing under tension an extended length of film strip, heating a portion of said tensioned length to a degree to render it plastic, thereby elongating the film, and subsequently cooling said heated portion while still under tension.

8. The method of stretching cinematographic film strips which includes the steps of successively passing a continuous strip through a heated chamber and through a cooling chamber during transit through each of which said strip is under tension.

9. The method of stretching cinematographic film strips which includes the steps of successively subjecting the portions of a continuous film strip to heat to a degree to render it plastic and to a lower temperature to set it, and imposing a tension upon said strip during its subjection to such different temperatures.

10. The method of stretching cinematographic film strips which includes the steps of tensioning a relatively long portion of a film strip and first heating the same to an extent to render it plastic and thereafter cooling the same to set it.

11. The method of treating cinematographic film strips which includes the step of unequally tensioning different lateral zones of such a strip.

12. The method of treating cinematographic film strips which includes the step of tensioning different lateral zones of a strip in inverse proportion to their excesses of length over normal.

13. Apparatus for the treatment of cinematographic film strips including in combination film feeding and traction means adapted to simultaneously operate upon different portions of a film strip to provide equal movement thereof, means for controllable tensioning the film strip between the feeding and traction means, and means for controlling the temperatures of the strip between the feeding and traction means so as to render the film sufficiently plastic in one portion to cause stretching thereof and thereafter to sufficiently cool the same to set the film in the stretched condition.

14. Apparatus for the treatment of cinematographic film strips including, in combination, a film feeding and traction means adapted to simultaneously operate upon two portions of a film strip to provide equal movement thereof, means for heating a portion of film between the said feeding and traction means to render it plastic, and means for applying tension to the heated portion of film to stretch the same.

15. Apparatus for the treatment of cinematographic film strips including, in combination, a film feeding and traction means adapted to simultaneously operate upon two portions of a film strip to provide equal movement of the said portions, means for heating a portion of the film strip between the said feeding and traction means, means for applying tension to the said portion while in the heated condition to stretch the same and means for cooling the said film portion while under tension to attain a permanent set thereof.

16. Apparatus for the treatment of cinematographic film strips including, in combination, film feeding and traction means, and means for stretching a film strip and setting it in stretched condition co-operating with said feeding and winding means and including means for lowering the yield point of said strip during stretching.

17. Apparatus for the treatment of cinematographic film strips including, in combination, a rotatable member carrying upon its periphery means engageable in the sprocket holes of a film strip, means for guiding spaced partitions of a film into engagement with spaced portions of the periphery of said member, and means for stretching the portion of said film strip intermediate said spaced portions.

18. Apparatus for the treatment of cinematographic film strips including, in combination, a rotatable member carrying upon its periphery means engageable in the sprocket holes of a film strip, means for guiding spaced portions of a film strip into engagement with spaced portions of the periphery of said member, and means for heating and stretching the portion of said film strip intermediate said spaced portions.

19. Apparatus for the treatment of cinematographic film strips including, in combination, a rotatable member carrying upon its periphery means engageable in the sprocket holes of a film strip, means for guiding spaced portions of a film strip into engagement with spaced portions of the periphery of said member, and means for heating, stretching, and cooling the portion of said film strip intermediate said spaced portions.

20. Apparatus for the treatment of cinematographic strips including, in combination, a rotatable member carrying upon its periphery means engageable in the sprocket holes of a film strip, means for effecting rotation thereof, means for guiding and maintaining spaced portions of a film strip in engagement with spaced portions of the periphery of said member, and means including a roll engageable with the portions of said strip intermediate said spaced portions and adjustable relative to said rotatable member for applying a film strip stretching tension to said portion.

21. Apparatus for the treatment of cinematographic film strips including, in combination, a rotatable member carrying upon its periphery means engageable in the sprocket holes of a film strip, means for effecting rotation thereof, means for guiding spaced portions of a film strip into engagement with spaced portions of the periphery of said member whereby said member pays out at one of said portions and winds in at the other, and means for treating the portion of a film strip between said spaced portions thereof including a heating chamber and a cooling chamber traversed by said strip, and means for tensioning the portion of said strip in said chambers.

22. Apparatus for the treatment of cinematographic film strips including, in combination, a rotatable member carrying upon its periphery means engageable in the sprocket holes of a film strip, means for effecting rotation thereof, means for guiding spaced portions of a film strip into engagement with spaced portions of the periphery of said member whereby said member pays out at one of said portions and winds in at the other, and means for treating the portion of a film strip between said spaced portions thereof including a heating chamber and a chilling chamber traversed by said strip, and means for adjustably tensioning the portion of said strip in said chambers.

23. Apparatus for the treatment of cinematographic film strips including, in combination, a rotatable member carrying upon its periphery means engageable in the sprocket holes of a film strip, means for effecting rotation thereof, means for guiding spaced portions of a film strip into engagement with spaced portions of the periphery of said member whereby said member pays out at one of said portions and winds in at the other, and means for treating the portion of a film strip between said spaced portions thereof including aligned heating and setting chambers, a film guiding pulley rotatable on a fixed axis in one of said chambers, and a film tensioning pulley rotatable on a movable axis in the other.

24. Apparatus for the treatment of cinematographic film strips including, in combination, a rotatable member carrying upon its periphery means engageable in the sprocket holes of a film strip, means for effecting rotation thereof, means for guiding spaced portions of a film strip into engagement with spaced portions of the periphery of said member whereby said member pays out at one of said portions and winds in at the other, and means for treating the portion of a film strip between said spaced portions thereof including aligned heating and setting chambers, a film guiding pulley rotatable on a fixed axis in one of said chambers, and a film tensioning pulley rotatable on a movable axis on the other and means for exerting a yielding tension on said last mentioned pulley.

25. Apparatus for the treatment of cinematographic film strips including, in combination, rotatable means for paying out and winding in spaced portions of a film strip, and means for treating a loop intermediate said portions including a pulley for subjecting said loop to tension having a strip engaging periphery whose elements are curvilinear.

26. Apparatus for stretching shrunken cinematographic film to standard length comprising positively interconnected means engaging the sprocket holes of the film at points spaced along the path of the film a predetermined constant distance sufficient to stretch the portion of the shrunken film therebetween to standard length as it is fed past said means.

27. Apparatus for stretching a shrunken cinematographic film to standard length comprising positively interconnected means engaging the sprocket holes of the film at points spaced along the path of the film, and means for predeterminedly effecting variation in the length of film between said points of engagement, said points of engagement being spaced appropriately to stretch the portion of the shrunken film to standard length as it is fed past said means.

28. Apparatus for stretching a shrunken cinematographic film to standard length comprising positively interconnected means engaging the sprocket holes of the film at points spaced along the path of the film a predetermined distance sufficient to stretch the portion of shrunken film therebetween to standard length as it is fed past said means, and means co-operating with the portion of said film between said positively interconnected means to vary predeterminedly the length thereof.

Signed by me at Boston, Massachusetts, this 14th day of April 1925.

LEONARD T. TROLAND.